United States Patent
Yang et al.

(10) Patent No.: US 11,401,588 B2
(45) Date of Patent: Aug. 2, 2022

(54) ADDITIVE MANUFACTURING METHOD OF LEAD-FREE ENVIRONMENTALLY-FRIENDLY HIGH-STRENGTH BRASS ALLOY

(71) Applicant: South China University of Technology, Guangzhou (CN)

(72) Inventors: Chao Yang, Guangzhou (CN); Yanjie Zhao, Guangzhou (CN); Yuanyuan Li, Guangzhou (CN)

(73) Assignee: South China University of Technology, Guangdong (CN)

( * ) Notice: Subject to any disclaimer, the term of this patent is extended or adjusted under 35 U.S.C. 154(b) by 645 days.

(21) Appl. No.: 16/094,190

(22) PCT Filed: Nov. 9, 2017

(86) PCT No.: PCT/CN2017/110097
§ 371 (c)(1),
(2) Date: Oct. 16, 2018

(87) PCT Pub. No.: WO2019/029031
PCT Pub. Date: Feb. 14, 2019

(65) Prior Publication Data
US 2019/0276918 A1    Sep. 12, 2019

(30) Foreign Application Priority Data
Aug. 7, 2017    (CN) .......................... 201710666286.0

(51) Int. Cl.
*B22F 1/00*    (2022.01)
*B22F 3/00*    (2021.01)
(Continued)

(52) U.S. Cl.
CPC ........ *C22C 33/0235* (2013.01); *B22F 1/0003* (2013.01); *B22F 1/065* (2022.01);
(Continued)

(58) Field of Classification Search
CPC ..... C22C 33/0235; C22C 9/04; C22C 1/0425; B22F 10/20; B22F 1/0048; B22F 9/082;
(Continued)

(56) References Cited

U.S. PATENT DOCUMENTS

| | | | | |
|---|---|---|---|---|
| 6,500,583 B1* | 12/2002 | Ting | ...................... | C01B 3/0057 429/218.2 |
| 2004/0191106 A1* | 9/2004 | O'Neill | ............... | A61F 2/30965 419/2 |
| 2011/0104000 A1* | 5/2011 | Xu | ........................... | C22C 9/04 420/471 |

FOREIGN PATENT DOCUMENTS

| CN | 104117672 A | 10/2014 |
|---|---|---|
| CN | 105478766 A | 4/2016 |

(Continued)

OTHER PUBLICATIONS

Gibson, D.W. Rosen, and B. Stucker, Additive Manufacturing . . . Technologies, DOI 10.1007/978-1-4419-1120-9_1, Springer Science+ Business Media, LLC 2010 (Gibson) (Year: 2010).*

(Continued)

*Primary Examiner* — Rebecca Janssen
(74) *Attorney, Agent, or Firm* — Masuvalley and Partners; Peter R. Martinez

(57) ABSTRACT

The present invention discloses an additive manufacturing method of lead-free environmentally-friendly high-strength brass alloys, which mainly comprises five steps of gas atomization milling, model building, forming chamber preparation, pre-spreading powder and selective laser forming. Wherein the lead-free environmentally-friendly high-strength brass alloy comprises the following elements: Zn 5.5-40 wt. %, Si 0.5-4 wt. %, trace elements Al and Ti totally 0-0.5 wt. %, and Cu for the balance. Its microstructure includes micron-sized cell crystals and dendrites. By the above method, it is possible to obtain a nearly fully compact (Continued)

high-strength brass alloy and nearly net-formed complex parts thereof. The formed high-strength brass alloy has beautiful color and excellent physical properties such as excellent electrical conductivity, thermal conductivity, corrosion resistance and machinability. It can be widely used in sanitary ware, hardware decoration, radiators, electronic communication, low temperature piping, pressure equipment and other machinery manufacturing fields.

7 Claims, 3 Drawing Sheets

(51) Int. Cl.
*B22F 9/08* (2006.01)
*C22C 9/04* (2006.01)
*B22F 10/20* (2021.01)
*B22F 1/065* (2022.01)
*B33Y 10/00* (2015.01)
*C22C 33/02* (2006.01)
*B33Y 70/00* (2020.01)

(52) U.S. Cl.
CPC .............. *B22F 3/001* (2013.01); *B22F 9/082* (2013.01); *B22F 10/20* (2021.01); *C22C 9/04* (2013.01); *B33Y 10/00* (2014.12); *B33Y 70/00* (2014.12); *Y02P 10/25* (2015.11)

(58) Field of Classification Search
CPC .... B22F 1/0003; B22F 3/001; B22F 2999/00; B22F 2998/10; B22F 10/00; Y02P 10/25; B33Y 10/00; B33Y 70/00
See application file for complete search history.

(56) References Cited

FOREIGN PATENT DOCUMENTS

| | | |
|---|---|---|
| CN | 105880594 A | 8/2016 |
| CN | 106435270 A | 2/2017 |
| CN | 106862561 A | 6/2017 |
| EP | 2 998 059 A1 | 3/2016 |

OTHER PUBLICATIONS

ISA/CN, International Search Report dated Apr. 20, 2018 in International Application No. PCT/CN2017/110097, 11 pages.

* cited by examiner

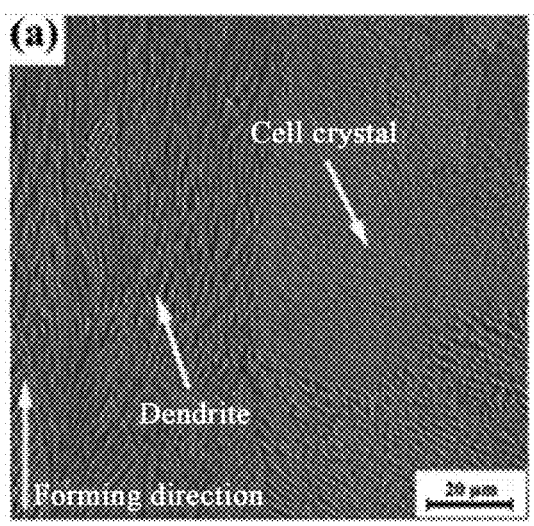 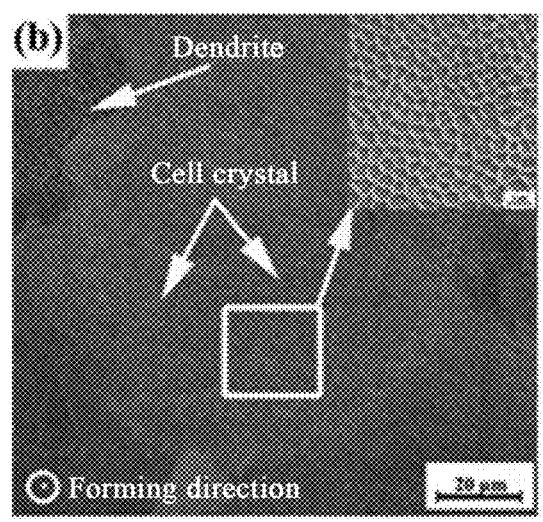
Fig. 2(a)                    Fig. 2(b)

ADDITIVE MANUFACTURING METHOD OF LEAD-FREE ENVIRONMENTALLY-FRIENDLY HIGH-STRENGTH BRASS ALLOY

RELATED APPLICATIONS

This application is the U.S. National Phase of and claims priority to International Patent Application No. PCT/CN2017/110097, International Filing Date Nov. 9, 2017, entitled AN ADDITIVE MANUFACTURING METHOD OF LEAD-FREE ENVIRONMENTALLY-FRIENDLY HIGH-STRENGTH BRASS ALLOY; which claims benefit of Chinese Patent Application No. CN 201710666286.0 filed Aug. 7, 2017; both of which are incorporated herein by reference in their entireties.

FIELD OF THE INVENTION

The present invention relates to the field of manufacturing new environmentally-friendly brass alloys and parts thereof, and in particular to an additive manufacturing method of lead-free environmentally-friendly high-strength brass alloys.

BACKGROUND OF THE INVENTION

Brass is an alloy of copper and zinc. Brass alloys have beautiful color and excellent electrical conductivity and thermal conductivity. They are widely used in hardware decorations, medals, steam pipes, air-conditioning internal and external connecting tubes and radiators, electronic communication, etc. They have good corrosion resistance, and are widely used in chemical engineering, ship parts and other fields such as cryogenic pipelines, submarine transportation pipes, etc. They have good mechanical properties, easy cutting and other processing performances, and are widely used in machinery manufacturing fields such as bolts, nuts, washers, springs, valves, water pipes, faucets, and pressure-resistant equipment. In particular, for the brass alloy HPb59-1 for parts such as faucets used in the sanitary industry, since the toxic element lead is the main alloying element of this type of brass and is always present in the brass, the lead brass faucet has certain toxic side effects and is extremely harmful to the human body, difficult to meet the minimum limit of 5 µg/L of lead precipitation in GB18145-2014 "Ceramic Cartridge Faucet Standard". On Jan. 4, 2011, the United States officially signed the lead-free bill, which required the lead content of pipelines and equipment exposed to drinking water in the US states to be reduced from 8% to 0.25%. The EU, Japan, and the United Kingdom have also introduced similar laws and regulations. Therefore, the search for a new type of lead-free brass alloy material has become an important issue to be solved in various industries such as sanitary ware.

Precision and complex parts of traditional brass alloys, such as faucets and other components, are manufactured mainly by gravity casting, low pressure casting and other processes. However, there are a series of unfavorable factors in the casting process, e.g., the cooling rate is slow, the grains of the castings are not small enough, and the composition segregation and some common defects such as shrinkage cavity, shrinkage porosity, pores, inclusions, cracks, etc. are easy to occur, the hot workability is poor, and the structure of the alloy is nonuniform, which will not only seriously affect the mechanical properties of brass alloys, but also reduce the corrosion resistance of brass. Besides, the casting process cannot form parts with complex structure and excellent performance, which seriously affects the promotion and use of brass alloys. Therefore, exploring new forming processes for brass alloy parts, improving the performance of brass alloy parts and expanding their application fields have become an urgent problem to be solved.

Selective Laser Melting (SLM) is a newly developed additive manufacturing technology that can directly melt metal powder completely under the heat effect of laser beam according to the 3D data model and solidify it into a metal part with good metallurgical bonding property and high precision, especially suitable for the manufacture of complex thin-walled precision components such as those with thin walls, complicated internal cavities and internal flow paths that are difficult to achieve by traditional machining techniques. Besides, the SLM technique has a unique high cooling rate and contains a wide range of non-equilibrium solidification phenomena during the cooling process, which can refine the grains and increase the solid solubility, so that the structure of the formed part is fine and compact, the composition is uniform, and the performance is excellent. In addition, the SLM technique can also reduce the capital investment in mold design, and only needs about 20% of the cost of the traditional manufacturing process and about 10% of the time to manufacture the required parts, greatly improving production efficiency. In the SLM process, in order to ensure sufficient energy input to obtain nearly fully compact parts with excellent performance, the alloying elements suitable for the SLM process usually need to meet the following three basic physical properties (Reference 1: Manakari V, Parande G, Gupta M. Selective laser melting of magnesium and magnesium alloy powders: a review [J]. Metals, 2016, 7(1): 2): (1) Having a high laser absorption rate, (2) having a low thermal conductivity, and (3) not containing a volatile element with a low boiling point. So far, the alloy systems widely studied by the SLM technique are mainly stainless steel alloys, nickel-based alloys, titanium-based alloys, aluminum-based alloys, and cobalt-chromium alloys, etc., which meet the above three basic physical properties. However, copper and copper alloys greatly limit the performance of SLM-formed brass parts due to their low laser absorption rate and high thermal conductivity. For example, copper alloys formed by the SLM technique have been reported to include Cu-4.3Sn (Reference 2: Ventura A P, Wade C A, Pawlikowski G, et al. Mechanical properties and microstructural characterization of Cu-4.3 Pct Sn fabricated by selective laser melting [J]. Metallurgical & Materials Transactions A, 2017, 48: 1-10), Cu—Cr—Zr—Ti alloy (Reference 3: Popovich A, Sufiiarov V, Polozov I, et al. Microstructure and mechanical properties of additive manufactured copper alloy [J]. Materials Letters, 2016, 179:38-41), and so on, and have a low relative density (94.05%) and the resulting poor mechanical properties and other defects. In particular, since zinc is a typical volatile element with a low boiling point (900° C.), it is more difficult to form zinc-containing alloys by melting-related technology. At present, there is only a small amount of research on forming zinc-containing alloys by the SLM technique (Reference 4: Wei K, Wang Z, Zeng X. Influence of element vaporization on formability, composition, microstructure, and mechanical performance of the selective laser molten Mg—Zn—Zr components [J]. Materials Letters, 2015, 156(18):187-190). Therefore, it is especially difficult to form a zinc alloy containing the zinc element with a high content and a low boiling point, and the matrix element of the copper element with a low laser absorption rate and a high thermal conductivity (which does not satisfy the above three basic physical properties) by the SLM technique from a technical point of view.

At present, successful cases of successfully preparing brass alloys and their parts using the SLM technique have rarely been reported in the literature. Therefore, in view of many academic and technical problems of the existing brass alloy materials containing lead, the defects of the traditional casting technology, and the technical difficulty of forming the brass alloy by the SLM technique, it is necessary to explore a lead-free environmentally-friendly high-strength brass alloy suitable for the SLM technique forming and the additive manufacturing method thereof, so as to expand the industrial application field of brass alloys, which will have important reference significance for alloy materials with excellent preparation performance, complex structure and extreme physical parameters.

CONTENTS OF THE INVENTION

In view of the fact that the brass alloys and their parts have not been formed by the SLM technique at present, an object of the present invention is to provide an additive manufacturing method for lead-free environmentally-friendly high-strength brass alloys, which has the characteristics of short cycle, less material loss and excellent product performance, overcomes the defects of the traditional casting process by which it is difficult to manufacture complex brass alloy parts, and solves the technical problem of forming the brass alloy by the SLM technique.

The object of the present invention can be achieved by the following technical solutions:

An additive manufacturing method of lead-free environmentally-friendly high-strength brass alloys is provided, comprising the following steps:

(1) Milling: elements of Cu, Zn, Si, Al, and Ti are blended according to the following mass percentages: Zn 5.5-40 wt. %, Si 0.5-4 wt. %, trace elements Al and Ti totally 0-0.5 wt. %, and Cu for the balance, and a gas atomization method is used to prepare brass alloy powder, with the obtained brass alloy powder sieved to obtain spherical powder of a suitable particle size suitable for additive manufacturing;

(2) model building: a 3D model of structural parts to be prepared is built and inputted into Magics 15.01 for layered processing, and the processed data are inputted into the laser scanning path generation software of RPPath to generate a print file;

(3) preparation of a forming chamber: the print file is introduced into a selective laser melting (SLM) forming device, a vacuum pump is used to vacuumize the sealed forming chamber to a relative vacuum of −60 kPa, and a protective gas is inputted into the sealed forming chamber; the above steps are repeated until the content of oxygen in the sealed forming chamber is reduced to less than 1 ppm, and the content of oxygen in the forming chamber during the laser forming process is kept to be always lower than 100 ppm during the laser forming process;

(4) pre-spreading powder: the brass alloy powder with a thickness of 50-100 μm is uniformly pre-spread on a stainless steel substrate by a powder-spreading device, and the excess brass alloy powder is sent to a recovery cylinder and then collected for repeated use;

(5) laser melting forming: a laser is used to melt the pre-spread brass alloy powder according to the set processing parameters based on the computer-designed slice shape and laser scanning strategy, and then a flat molten layer of the brass alloy is formed on the stainless steel substrate; then the stainless steel substrate is lowered by a distance of a set thickness, the brass powder with the same thickness as the lowered thickness of the stainless steel substrate is again pre-spread on the molten layer of the brass alloy, and the spread brass alloy powder is again subjected to laser scanning, with only one laser scanning required for each layer, such that a flat molten layer of the brass alloy is obtained; and (6) the step (5) is repeated until a brass alloy block formed by the laser-scanned brass powder reaches the predetermined size and shape, and a formed article is cut from the stainless steel substrate to obtain a formed brass alloy sample.

Further, the gas atomization method in the step (1) for preparing the brass alloy powder includes the following specific steps: The powder of the elements is uniformly mixed according to the above mass percentages and is molten into a uniform metal liquid by an induction furnace, and the metal liquid is injected into a tundish above an atomizing nozzle, and then the metal liquid flows out of a hole at the bottom of the tundish; when the metal liquid flows out, it meets with the high-speed airflow from the atomizing nozzle and is atomized into small droplets, and the atomized droplets rapidly solidify into powder in a closed atomizing cylinder; the main process parameters are as follows: the protective gas is nitrogen or argon, the melting temperature is from 1150° C. to 1300° C., the melting time is 30-60 min, and the metal liquid is sprayed at a flow rate of 5-10 kg/min under a pressure of 2.5-5 MPa to obtain the brass alloy powder.

Further, in the step (1), the spherical powder of a suitable particle size refers to the brass alloy powder having a particle size distribution in the range of 15-51 μm.

Further, the laser scanning path in the step (2) is of an S-type orthogonal stacking scan.

Further, the model of the selective laser melting forming device is Dimetal 280.

Further, the selective laser melting forming device described in the step (3) includes a laser, a gas purifying device, an optical path transmission unit, a sealed forming chamber, a powder-spreading device, a control system, and process software, etc.

Further, the laser is an SPI fiber laser with a wavelength of 1090 nm, a maximum power of not less than 160 W, and a focused spot diameter of 30-70 μm; the powder-spreading device, arranged in the sealed forming chamber, is composed of a hopper and a powder-spreading brush under the hopper; the powder-spreading brush is an elastic-tooth flexible blade, and is a 304 stainless steel sheet with a thickness of 30-100 μm, wherein each of the elastic-tooth flexible blades is cut by a fiber laser, and an interval of the elastic-tooth flexible blades has a width of a slit cut by the laser.

Further, the processing parameters described in the step (5) are as follows: The input power P of the laser satisfies $P \geq 150$ W, the laser scanning speed v satisfies $v \leq 500$ mm/s, the laser scanning pitch h satisfies $h = 60\text{-}90$ μm, the thickness t by which the stainless steel substrate is lowered satisfies $t = 20\text{-}40$ μm, and the energy input density E satisfies $E = P/v \times h \times t$ and $333 \leq E \leq 416$ J/mm$^3$.

When the energy input density is less than 333 J/mm$^3$, the input energy is insufficient to completely melt the brass powder, such that a sufficiently compact brass sample cannot be obtained. When the energy input density is greater than 416 J/mm$^3$, the surface area of the molten pool increases, the cooling and solidification time is longer, and the tendency of oxidation and spheroidization is increased. Besides, increasing the laser power is likely to cause large thermal stress to result in warping deformation. In addition, the zinc element has a low boiling point and is volatile, and excessive power makes the zinc element apparently vaporized, so that the porosity of the formed part is increased and the zinc element is ablated.

Further, the lead-free environmentally-friendly high-strength brass alloy prepared according to the following mass percentages includes micron-sized cell crystals and dendrites: Zn 5.5-40 wt. %, Si 0.5-4 wt. %, trace elements Al and Ti totally 0-0.5 wt. %, and Cu for the balance. When the content of Zn is 35-40 wt. %, the phase composition includes an α phase of the face-centered cubic structure (i.e., a solid solution of Zn dissolved in Cu) and a β phase of the body-centered cubic structure (i.e., a CuZn-based solid solution). When the content of zinc is less than 35 wt. % and the content of silicon is more than 2.0 wt. %, the phase composition includes an α-Cu phase of the face-centered cubic structure in which Zn and Si are solid solution elements, and a $Cu_7Si$ phase of the close-packed hexagonal structure.

Further, the lead-free environmentally-friendly high-strength brass alloy additive can be used in various mechanical manufacturing fields such as sanitary ware, hardware decoration, radiators, electronic communication, cryogenic pipeline, and pressure resistant equipment.

Compared with the prior art, the present invention has the following advantages and beneficial effects:

1. The present invention adopts the SLM technique to form high-strength brass alloy parts. Compared with the traditional casting manufacturing method, the laser melting has the characteristics of rapid heating and rapid cooling, so that the reaction in the molten pool is fast, the diffusion time is extremely short, and no component segregation occurs. Further, the microstructure of the material is effectively refined, and the high-density, high-yield and high-strength brass alloy parts are obtained; the yield strength is up to 275 MPa and the hardness is up to 205 HV, which are much higher than those of the cast brass alloy of the same composition (205 MPa, 170HV); the tensile strength is up to 371.5 MPa, and the breaking strain is 7.5%, which can be compared with the performance of the cast brass alloy of the same composition (450 MPa, 9.5%); the density is up to 98.8%, which is significantly higher than that of a reported copper alloy formed by the SLM technique.

2. The present invention adopts the SLM technique to form high-strength brass alloy parts, and forms samples by a point-by-point line-by-line layer-by-layer way. The molten pools do not move relative to each other, and react uniformly in the liquid phase. Compared with the cast brass alloy, the formed brass alloy sample has more uniform composition and no obvious segregation except for the finer grain, and it is easier to form a uniform and dense oxide film during electrochemical corrosion. Therefore, compared with cast parts, the brass alloys formed by the SLM process are more resistant to corrosion.

3. By adopting the SLM forming process, the present invention can form the brass parts of a complex shape according to the computer-designed 3D model, realize the rapid manufacture of the complex brass alloy parts, and greatly expand the application of the brass alloys in the industrial field.

4. After the SLM forming in the present invention, the brass alloy powder outside the selected area can be collected and reused, thereby improving the utilization rate of the materials and thus saving costs.

BRIEF DESCRIPTION OF THE DRAWINGS

FIG. 2(a) is a scanning electron micrograph of a side view of the brass alloy part prepared by the SLM technique in Example 1 of the present invention, and FIG. 2(b) is a scanning electron micrograph of a top view of the brass alloy part prepared by the SLM technique in Example 1 of the present invention.

DETAILED DESCRIPTION OF THE EMBODIMENTS

The present invention will be further described in detail with reference to examples and accompanying drawings, but the embodiments of the present invention are not limited thereto.

Example 1

Figure 1:
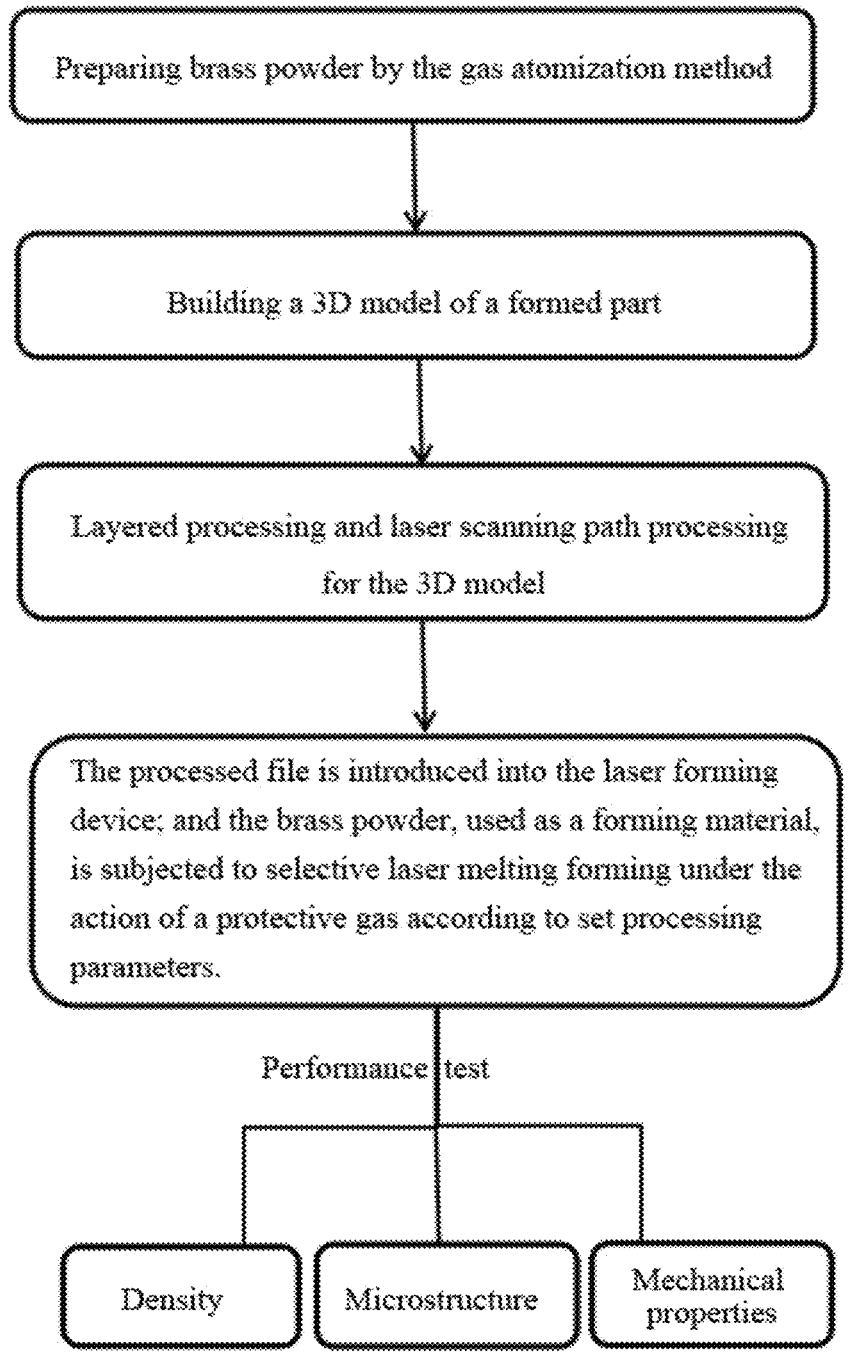
FIG. 1 is a process flow diagram of manufacturing a brass alloy part by the SLM technique in Example 1 of the present invention.

This example provides an additive manufacturing method for lead-free environmentally-friendly high-strength brass alloys. The flow chart of the method is as shown in FIG. 1, and the method includes the following steps:

1. Elements are provided according to the following mass ratios: Zn 15.5 wt. %, Si 2.8 wt. %, trace elements Al and Ti totally 0.5 wt. %, and Cu for the balance. In a protective atmosphere of nitrogen, the powders of the elements, which are uniformly mixed according to the above percentages, are molten into a uniform metal liquid by an induction furnace at a melting temperature of 1250° C. for a melting time of 45 min. At a pressure of 5 MPa, the metal liquid is sprayed at a flow rate of 7 kg/min to obtain the gas atomized brass alloy powder. Since the original powder prepared by gas atomization contains a certain amount of powder that is too large or too small and affects the laser forming effect, the powder prepared by gas atomization is subjected to gas flow classification and screening treatment, so that the particle size of the powder is controlled in the range of 15-51 µm.

2. The 3D modeling software is used to build a 3D model of the structure of the required part; the 3D model is inputted into the software of Magics 15.01 for layering processing, and then inputted into the laser scanning path generation software of RPPath to generate a print file, with the laser scanning path set to be of an S-type orthogonal stacking scan.

3. The print file is introduced into a laser forming device (Dimetal-280); the forming chamber is sealed, a vacuum pump is used to vacuumize the forming chamber to a relative vacuum of −60 kPa, and a protective gas of argon is inputted into the forming chamber; the above steps are repeated until the content of oxygen in the forming chamber is reduced to less than 1 ppm, and the content of oxygen in the forming chamber during the laser forming process is kept to be always lower than 100 ppm; the brass alloy powder with a thickness of 50-100 µm is uniformly pre-spread on a stainless steel substrate by a powder-spreading device, and the excess brass alloy powder is sent to a recovery cylinder and then collected for repeated use.

4. A laser is used to melt the pre-spread brass alloy powder according to the set processing parameters based on the computer-designed slice shape and laser scanning strategy, and then a flat molten layer of the brass alloy is formed on the substrate; then the forming substrate is lowered by a distance of a certain thickness, the brass powder with the same thickness is again pre-spread on the molten layer, and the spread brass alloy powder is again subjected to laser scanning, with only one laser scanning required for each layer. The laser is an SPI fiber laser with a wavelength of 1090 nm, a focused spot diameter of about 70 μm, and a maximum power of 200 W. The processing parameters are set as follows: The laser power P is 190 W, the laser scanning power is 200 mm/s, the scanning pitch is 80 μm, the powder spreading thickness is 30 μm, and the energy input density E satisfies E=395 J/mm$^3$.

5. The above steps are repeated to melt the brass alloy powder layer by layer until the sample is formed, and the formed part is cut from the forming substrate to obtain a brass alloy sample.

6. A square brass alloy sample formed by the above steps is polished from having a rough surface to a bright mirror surface, and the density is measured by the Archimedes drainage method, and then the Vickers hardness is measured; a cylindrical brass alloy sample formed by the above steps is cut according to a designed tensile pattern of the international standard (Chinese GB/T 228-2002), and tensile samples are obtained for a tensile performance test.

Figure 3:
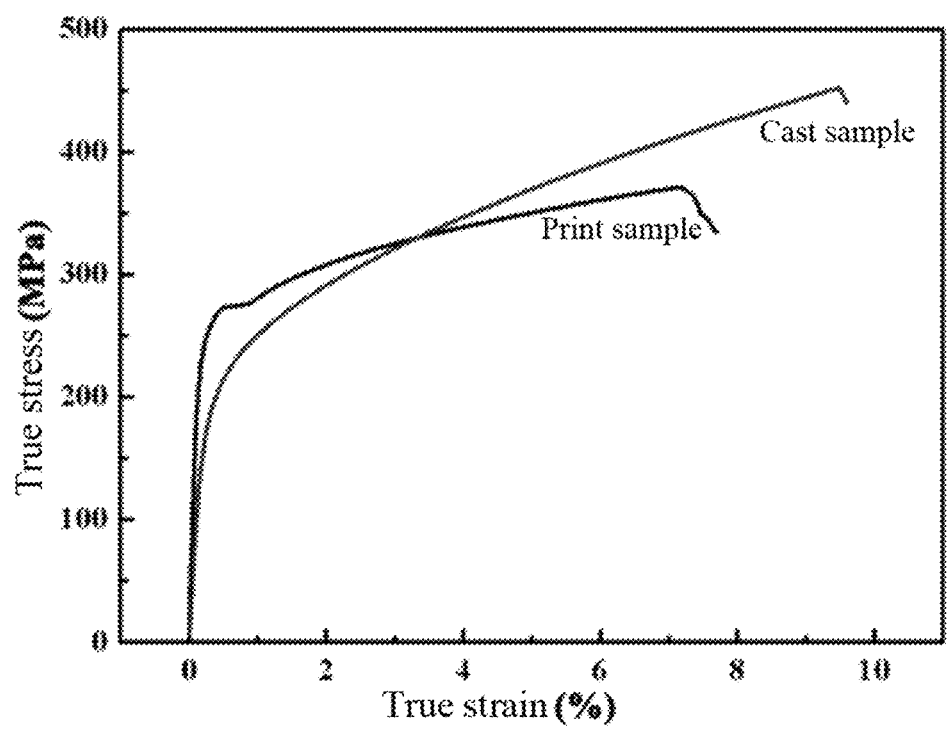
FIG. 3 compares the brass alloy part prepared by the SLM technique in Example 1 of the present invention and a cast brass alloy part of the same composition in terms of their hardness and tensile true stress-true strain curves.

In this example, the density of the silicon brass alloy formed in the range of the processing parameters is up to 98.8%, which shows that the silicon brass alloy is nearly fully compact and the density is significantly higher than that of the reported copper alloy Cu-4.3Sn (97%), Cu—Cr—Zr—Ti (97.9%) and the zinc-containing alloy Mg-5.2Zn-0.5Zr (94.05%) formed by the SLM technique. FIGS. 2(a) and 2(b) are respectively a side-view scanning electron micrograph and a top-view scanning electron micrograph of a brass alloy part prepared by the SLM technique in the present example. It can be seen from FIGS. 2(a) and 2(b) that the microstructure of the sample is mainly composed of micron-sized dendrites and cell crystals, and there are the solid solution of α-Cu(Zn, Si) in the crystal cell and a composite phase composed of the solid solutions of α-Cu (Zn, Si) and Cu$_7$Si in the grain boundary. The hardness and tensile true stress-true strain curves of a brass alloy part prepared by the SLM technique in this example and a cast brass alloy part of the same composition are shown in FIG. 3. It can be seen from FIG. 3 that the brass alloy part produced by the method of this example has the yield strength up to 275 MPa and the hardness up to 205 HV, which are much higher than those of the cast brass alloy of the same composition (205 MPa, 170 HV), and the tensile strength up to 371.5 Mpa and the breaking strain up to 7.5%, which are comparable to those of the cast brass alloys of the same composition (450 MPa, 9.5%).

Example 2

This example provides an additive manufacturing method of lead-free environmentally-friendly high-strength brass alloys, which comprises the following steps:

1. Elements are provided according to the following mass ratios: Zn 5.5 wt. %, Si 2.0 wt. %, trace elements Al and Ti totally 0.5 wt. %, and Cu for the balance. In a protective atmosphere of nitrogen, the powders of the elements, which are uniformly mixed according to the above percentages, are molten into a uniform metal liquid by an induction furnace at a melting temperature of 1300° C. for a melting time of 60 min. At a pressure of 5 MPa, the metal liquid is sprayed at a flow rate of 10 kg/min to obtain the gas atomized brass alloy powder. Since the original powder prepared by gas atomization contains a certain amount of powder that is too large or too small and affects the laser forming effect, the powder prepared by gas atomization is subjected to gas flow classification and screening treatment, so that the particle size of the powder is controlled in the range of 15-51 μm.

2. The brass alloy powder is loaded into the laser forming device (Dimetal 280), which mainly includes a laser, a gas purifying device, an optical path transmission unit, a sealed forming chamber, a powder-spreading device, a control system, and process software, etc.

3. The 3D modeling software is used to build a 3D model of the required part; the 3D model is inputted into the software of Magics 15.01 for layering processing, and then inputted into the laser scanning path generation software of RPPath to generate a print file, with the laser scanning path set to be of an S-type orthogonal stacking scan.

4. The print file is introduced into a laser forming device (Dimetal-280); the forming chamber is sealed, a vacuum pump is used to vacuumize the forming chamber to a relative vacuum of −60 kPa, and a protective gas of argon is inputted into the forming chamber; the above steps are repeated until the content of oxygen in the forming chamber is reduced to less than 1 ppm, and the content of oxygen in the forming chamber during the laser forming process is kept to be always lower than 100 ppm; the brass alloy powder with a thickness of 50-100 μm is uniformly pre-spread on a stainless steel substrate by a powder-spreading device, and the excess brass alloy powder is sent to a recovery cylinder and then collected for repeated use.

5. A laser is used to melt the pre-spread brass alloy powder according to the set processing parameters based on the computer-designed slice shape and laser scanning strategy, and then a flat molten layer of the brass alloy is formed on the substrate; then the forming substrate is lowered by a distance of a certain thickness, the brass powder with the same thickness is again pre-spread on the molten layer, and the spread brass alloy powder is again subjected to laser scanning, with only one laser scanning required for each layer. The laser is an SPI fiber laser with a wavelength of 1090 nm, a focused spot diameter of about 30 μm, and a maximum power of 300 W. The processing parameters are set as follows: The laser power P is 300 W, the laser scanning power is 500 mm/s, the scanning pitch is 90 μm, the powder spreading thickness is 20 μm, and the energy input density E satisfies E=333.3 J/mm$^3$.

6. The above step 5 is repeated to melt the brass alloy powder layer by layer until the sample is formed, and the formed part is cut from the forming substrate to obtain a brass alloy sample.

7. The square brass alloy sample formed by the above steps is polished from having a rough surface to a bright mirror surface, and the density is measured by the Archimedes drainage method.

In this example, the silicon brass alloy formed in the range of the processing parameters has a density up to 98.5%, which shows that the formed silicon brass alloy is nearly fully compact; its phase composition includes an α-Cu phase of the face-centered cubic structure in which Zn and Si are solid solution elements and a Cu$_7$Si phase of the close-packed hexagonal structure, and its microhardness is 201 HV that is much higher than that of the cast alloy of the same composition (165 HV).

Example 3

This example provides an additive manufacturing method of lead-free environmentally-friendly high-strength brass alloys, which comprises the following steps:

1. Elements are provided according to the following mass ratios: Zn 20.5 wt. %, Si 4.0 wt. %, and Cu for the balance. In a protective atmosphere of nitrogen, the powders of the elements, which are uniformly mixed according to the above percentages, are molten into a uniform metal liquid by an induction furnace at a melting temperature of 1250° C. for a melting time of 40 min. At a pressure of 5 MPa, the metal liquid is sprayed at a flow rate of 5 kg/min to obtain the gas atomized brass alloy powder. Since the original powder prepared by gas atomization contains a certain amount of powder that is too large or too small and affects the laser forming effect, the powder prepared by gas atomization is subjected to gas flow classification and screening treatment, so that the particle size of the powder is controlled in the range of 15-51 μm.

2. The brass alloy powder is loaded into the laser forming device (Dimetal 280), which mainly includes a laser, a gas purifying device, an optical path transmission unit, a sealed forming chamber, a powder-spreading device, a control system, and process software, etc.

3. The 3D modeling software is used to build a 3D model of the required part; the 3D model is inputted into the software of Magics 15.01 for layering processing, and then inputted into the laser scanning path generation software of RPPath to generate a print file, with the laser scanning path set to be of an S-type orthogonal stacking scan.

4. The print file is introduced into a laser forming device (Dimetal-280); the forming chamber is sealed, a vacuum pump is used to vacuumize the forming chamber to a relative vacuum of −60 kPa, and a protective gas of argon is inputted into the forming chamber; the above steps are repeated until the content of oxygen in the forming chamber is reduced to less than 1 ppm, and the content of oxygen in the forming chamber during the laser forming process is kept to be always lower than 100 ppm; the brass alloy powder with a thickness of 50-100 μm is uniformly pre-spread on a stainless steel substrate by a powder-spreading device, and the excess brass alloy powder is sent to a recovery cylinder and then collected for repeated use.

5. A laser is used to melt the pre-spread brass alloy powder according to the set processing parameters based on the computer-designed slice shape and laser scanning strategy, and then a flat molten layer of the brass alloy is formed on the substrate; then the forming substrate is lowered by a distance of a certain thickness, the brass powder with the same thickness is again pre-spread on the molten layer, and the spread brass alloy powder is again subjected to laser scanning, with only one laser scanning required for each layer. The laser is an SPI fiber laser with a wavelength of 1090 nm, a focused spot diameter of about 50 μm, and a maximum power of 200 W. The processing parameters are set as follows: The laser power P is 200 W, the laser scanning power is 400 mm/s, the scanning pitch is 60 μm, the powder spreading thickness is 20 μm, and the energy input density E satisfies $E=416.6$ J/mm$^3$.

6. The above step 5 is repeated to melt the brass alloy powder layer by layer until the sample is formed, and the formed part is cut from the forming substrate to obtain a brass alloy sample.

7. The square brass alloy sample formed by the above steps is polished from having a rough surface to a bright mirror surface, and the density is measured by the Archimedes drainage method.

In this example, the silicon brass alloy formed in the range of the processing parameters has a density up to 97.8%, which shows that the formed silicon brass alloy is nearly fully compact; its phase composition includes an α-Cu phase (Zn, Si) of the face-centered cubic structure and a $Cu_7Si$ phase of the close-packed hexagonal structure, and its microhardness is 195 HV that is much higher than that of the cast alloy of the same composition (155 HV).

Example 4

This example provides an additive manufacturing method of lead-free environmentally-friendly high-strength brass alloys, which comprises the following steps:

1. Elements are provided according to the following mass ratios: Zn 40 wt. %, Si 0.5 wt. %, Al 0.4 wt. %, Ti 0.05 wt. %, and Cu for the balance. In a nitrogen atmosphere, the powders of the elements, which are uniformly mixed according to the above percentages, are molten into a uniform metal liquid by an induction furnace at a melting temperature of 1150° C. for a melting time of 30 min. At a pressure of 2.5 MPa, the metal liquid is sprayed at a flow rate of 10 kg/min to obtain the gas atomized brass alloy powder. Since the original powder prepared by gas atomization contains a certain amount of powder that is too large or too small and affects the laser forming effect, the powder prepared by gas atomization is subjected to gas flow classification and screening treatment, so that the particle size of the powder is controlled in the range of 15-51 μm.

2. The brass alloy powder is loaded into the laser forming device (Dimetal 280), which mainly includes a laser, a gas purifying device, an optical path transmission unit, a sealed forming chamber, a powder-spreading device, a control system, and process software, etc.

3. The 3D modeling software is used to build a 3D model of the required part; the 3D model is inputted into the software of Magics 15.01 for layering processing, and then inputted into the laser scanning path generation software of RPPath to generate a print file, with the laser scanning path set to be of an S-type orthogonal stacking scan.

4. The print file is introduced into a laser forming device (Dimetal-280); the forming chamber is sealed, a vacuum pump is used to vacuumize the forming chamber to a relative vacuum of −60 kPa, and a protective gas of argon is inputted into the forming chamber; the above steps are repeated until the content of oxygen in the forming chamber is reduced to less than 1 ppm, and the content of oxygen in the forming chamber during the laser forming process is kept to be always lower than 100 ppm; the brass alloy powder with a thickness of 50-100 μm is uniformly pre-spread on a stainless steel substrate by a powder-spreading device, and the excess brass alloy powder is sent to a recovery cylinder and then collected for repeated use.

5. A laser is used to melt the pre-spread brass alloy powder according to the set processing parameters based on the computer-designed slice shape and laser scanning strategy, and then a flat molten layer of the brass alloy is formed on the substrate; then the forming substrate is lowered by a distance of a certain thickness, the brass powder with the same thickness is again pre-spread on the molten layer, and the spread brass alloy powder is again subjected to laser scanning, with only one laser scanning required for each layer. The laser is an SPI fiber laser with a focused spot diameter of about 60 μm and a maximum power of 200 W. The processing parameters are set as follows: the laser power is 150 W (when the laser power exceeds 150 W, the zinc element is volatilized seriously, and thus the forming chamber is filled with volatile gas, which seriously affects the forming quality and service life of the laser and forces suspension of the process), the laser scanning power is 180 mm/s, the scanning pitch is 70 μm, the powder spreading thickness is 30 μm, and the energy input density E satisfies E=396 J/mm³.

6. The above step 5 is repeated to melt the brass alloy powder layer by layer until the sample is formed, and the formed part is cut from the forming substrate to obtain a brass alloy sample.

7. The brass alloy sample formed by the above steps is polished from having a rough surface to a bright mirror surface, and the density is measured by the Archimedes drainage method.

In this example, the brass alloy of the composition is formed within the range of the processing parameters. Since the laser power is low, and the zinc element has high content and is volatilized seriously, the formed brass sample has a density up to 92.5%, its structure consists of an α phase of the face-centered cubic structure (a solid solution of Zn dissolved in Cu) and a β phase of the body-centered cubic structure (a CuZn-based solid solution), and its hardness (180 HV) is higher than that of the cast alloy of the same composition (160 HV).

The above examples are only preferred examples of the present invention; however, the scope of protection of the present invention is not limited thereto, and equivalents or modifications of the technical solutions and inventive concept of the present invention made by any person skilled in the art within the scope of the disclosure of the present invention shall be within the scope of protection of the present invention.

What is claimed is:

1. An additive manufacturing method of a lead-free brass alloy comprising:
   (1) milling: only elements of Cu, Zn, Si, Al, and Ti are blended according to the following mass percentages: Zn 5.5-40 wt. %, Si 0.5-4 wt. %, trace elements Al and Ti totally 0-0.5 wt. %, and Cu for the balance, and a gas atomization method is used to prepare brass alloy powder, with the obtained brass alloy powder sieved to obtain spherical powder of a suitable particle size suitable for additive manufacturing;
   (2) model building: a 3D model of structural parts to be prepared is built for layered processing, and the processed data are inputted into a laser scanning path generation software to generate a print file;
   (3) preparation of a forming chamber: the print file is introduced into a selective laser melting forming device, a vacuum pump is used to vacuumize a sealed forming chamber to a relative vacuum of −60 kPa, and a protective gas is inputted into the sealed forming chamber; the step of vacuumizing the sealed forming chamber and inputting the protective gas are repeated until content of oxygen in the sealed forming chamber is reduced to less than 1 ppm, and the content of oxygen in the forming chamber is kept to be always lower than 100 ppm in step (5);
   (4) pre-spreading powder: a brass alloy powder layer with a thickness of 50-100 μm is uniformly pre-spread on a stainless steel substrate by a powder-spreading device, and the excess brass alloy powder is sent to a recovery cylinder and then collected for repeated use;
   (5) laser melting forming: a laser is used to melt the pre-spread brass alloy powder, and then a flat molten layer of the brass alloy is formed on the stainless steel substrate; then the stainless steel substrate is lowered by a distance of a set thickness, another brass powder layer with the same thickness as the lowered thickness of the stainless steel substrate is again pre-spread on the molten layer of the brass alloy; and
   (6) the step (5) is repeated until a brass alloy block formed by the laser-scanned brass powder reaches predetermined size and shape, and a formed article is cut from the stainless steel substrate to obtain the lead-free brass alloy; wherein the microstructure of the lead-free brass alloy includes micron-sized cell crystals and dendrites; when the content of Zn is 35-40 wt. %, the phase composition includes an α phase of the face-centered cubic structure which is a solid solution of Zn dissolved in Cu and a β phase of the body-centered cubic structure which is a CuZn-based solid solution; when the content of zinc is less than 35 wt. % and the content of silicon is more than 2.0 wt. %, the phase composition includes an α-Cu phase of the face-centered cubic structure in which Zn and Si are solid solution elements, and a $Cu_7Si$ phase of the close-packed hexagonal structure.

2. The additive manufacturing method of the lead-free brass alloy according to claim 1, wherein the gas atomization method in the step (1) for preparing the brass alloy powder includes the following specific steps: the powder of the elements uniformly mixed according to the above mass percentages is molten into a uniform metal liquid by an induction furnace, and the metal liquid is injected into a tundish above an atomizing nozzle, and then the metal liquid flows out of a hole at the bottom of the tundish; when the metal liquid flows out, it meets with the high-speed airflow from the atomizing nozzle and is atomized into small droplets, and the atomized droplets rapidly solidify into powder in a closed atomizing cylinder; the main process parameters are as follows: the protective gas is nitrogen or argon, the melting temperature is from 1150° C. to 1300° C., the melting time is 30-60 min, and the metal liquid is sprayed at a flow rate of 5-10 kg/min under a pressure of 2.5-5 MPa to obtain the brass alloy powder.

3. The additive manufacturing method of the lead-free brass alloy according to claim 1, wherein in the step (1), the spherical powder of a suitable particle size refers to brass alloy powder having a particle size distribution in the range of 15-51 μm.

4. The additive manufacturing method of the lead-free brass alloy according to claim 1, wherein the laser scanning path in the step (2) is of an S shape orthogonal stacking scan.

5. The additive manufacturing method of the lead-free brass alloy according to claim 1, wherein the selective laser melting forming device described in the step (3) includes a laser, a gas purifying device, an optical path transmission unit, a sealed forming chamber, a powder-spreading device, a control system, and process software.

6. The additive manufacturing method of the lead-free brass alloy according to claim 5, wherein the laser is with a wavelength of 1090 nm, a maximum power of not less than 160 W, and a focused spot diameter of 30-70 μm; the powder-spreading device, arranged in the sealed forming chamber, is composed of a hopper and a powder-spreading brush under the hopper; the powder-spreading brush is an elastic-tooth flexible blade, and is a 304 stainless steel sheet with a thickness of 30-100 μm, wherein each of the elastic-tooth flexible blades is cut by a fiber laser, and an interval of the elastic-tooth flexible blades has a width of a slit cut by the laser.

7. The additive manufacturing method of the lead-free brass alloy according to claim 1, wherein the processing parameters described in the step (5) are as follows: the input power P of the laser satisfies P≥150 W, the laser scanning speed v satisfies v≤500 mm/s, the laser scanning pitch h satisfies h=60-90 μm, the thickness t by which the stainless steel substrate is lowered satisfies t=20-40 μm, and the energy input density E satisfies E=P/v×h×t and 333≤E≤416 J/mm$^3$.

\* \* \* \* \*